US010664626B2

(12) United States Patent
Tang et al.

(10) Patent No.: US 10,664,626 B2
(45) Date of Patent: May 26, 2020

(54) ANTI-TAMPER MECHANISM AND ELECTRONIC DEVICE USING THE SAME

(71) Applicant: NANNING FUGUI PRECISION INDUSTRIAL CO., LTD., Nanning (CN)

(72) Inventors: Xiao-Hu Tang, Shenzhen (CN); Pei Liu, Shanghai (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/221,993

(22) Filed: Dec. 17, 2018

(65) Prior Publication Data

US 2020/0125773 A1 Apr. 23, 2020

(30) Foreign Application Priority Data

Oct. 22, 2018 (CN) .......................... 2018 1 1231800

(51) Int. Cl.
*G06F 21/86* (2013.01)
*H05K 5/03* (2006.01)
*H05K 5/02* (2006.01)
*F21V 8/00* (2006.01)

(52) U.S. Cl.
CPC ........... *G06F 21/86* (2013.01); *G02B 6/0078* (2013.01); *H05K 5/0208* (2013.01); *H05K 5/03* (2013.01)

(58) Field of Classification Search
CPC ........ H05K 5/0208; H05K 5/03; G06F 21/86; G02B 6/0078
See application file for complete search history.

(56) References Cited

U.S. PATENT DOCUMENTS

| 8,000,108 B2 | 8/2011 | Schmidt et al. |
| 9,564,699 B1 * | 2/2017 | Ma .......................... H01R 31/08 |
| 10,002,866 B2 | 6/2018 | Tanaka et al. |
| 10,306,753 B1 * | 5/2019 | Fadden ................ H05K 1/0275 |
| 2006/0176524 A1 | 8/2006 | Willrich |

(Continued)

FOREIGN PATENT DOCUMENTS

| TW | 200731763 A | 8/2007 |
| TW | 200907646 A | 2/2009 |

(Continued)

*Primary Examiner* — Daniel P Wicklund
*Assistant Examiner* — Sagar Shrestha
(74) *Attorney, Agent, or Firm* — ScienBiziP, P.C.

(57) ABSTRACT

A mechanism to prevent unauthorized physical use of an electronic device includes a main circuit board, a plurality of light sources, a plurality of sensors, a base, a plurality of optical members, and a magnetic member. The base comprises a base body and a plurality of guiding members. Each optical member comprises a main body and a magnetic portion. The main body of each optical member can change either a direction of propagation of light or a wavelength of light emitted from a light source, or both, and can propagate such light to a sensor which can forward to a control unit electrical signals representing a password input. When the electronic device is detached, the magnetic member attracts the magnetized optical members into random disorder on the cover, thereby destroying the predefined order.

20 Claims, 10 Drawing Sheets

(56) References Cited

U.S. PATENT DOCUMENTS

| | | | |
|---|---|---|---|
| 2007/0152839 A1* | 7/2007 | Dalzell | G06F 11/3044 340/686.1 |
| 2007/0281143 A1* | 12/2007 | Aylward | G02B 5/0236 428/212 |
| 2011/0019283 A1* | 1/2011 | Steenblik | D21H 21/40 359/622 |
| 2015/0313027 A1* | 10/2015 | Lin | H05K 5/0208 361/752 |
| 2016/0066444 A1* | 3/2016 | Fan | H01R 12/7076 439/78 |
| 2016/0231435 A1* | 8/2016 | Alvine | G02B 1/118 |
| 2017/0116830 A1* | 4/2017 | Isaacs | G08B 13/128 |
| 2017/0154194 A1* | 6/2017 | Huang | G06F 21/86 |
| 2018/0213660 A1* | 7/2018 | Prest | B22D 19/14 |

FOREIGN PATENT DOCUMENTS

| | | |
|---|---|---|
| TW | 201727681 A | 8/2017 |
| WO | 2017196151 A1 | 11/2017 |

* cited by examiner

ANTI-TAMPER MECHANISM AND ELECTRONIC DEVICE USING THE SAME

FIELD

The subject matter herein generally relates to security of electronic devices.

BACKGROUND

An electronic device may have protection against unauthorized physical interference as well as data hacking. Generally, when an opening operation is detected by a circuit board in the electronic device, a stop operation can be invoked.

BRIEF DESCRIPTION OF THE DRAWINGS

Implementations of the present technology will now be described, by way of embodiments, with reference to the attached figures.

DETAILED DESCRIPTION

Figure 1:
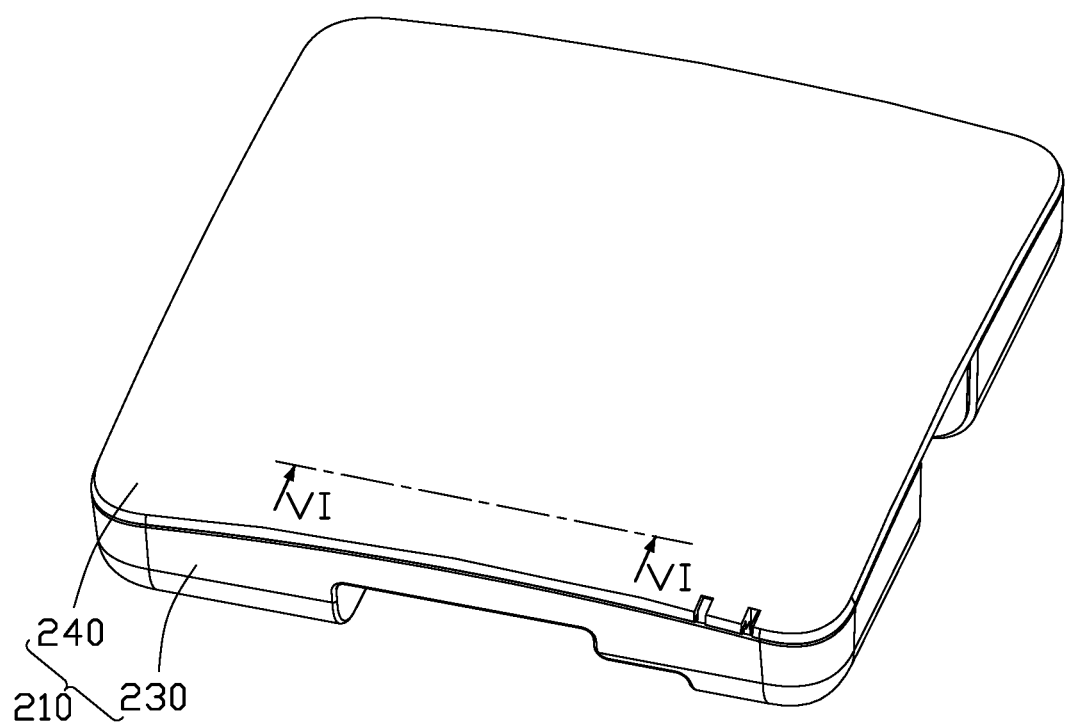
FIG. 1 is an isometric view of an electronic device with an anti-tamper mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to illustrate details and features of the present disclosure better.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
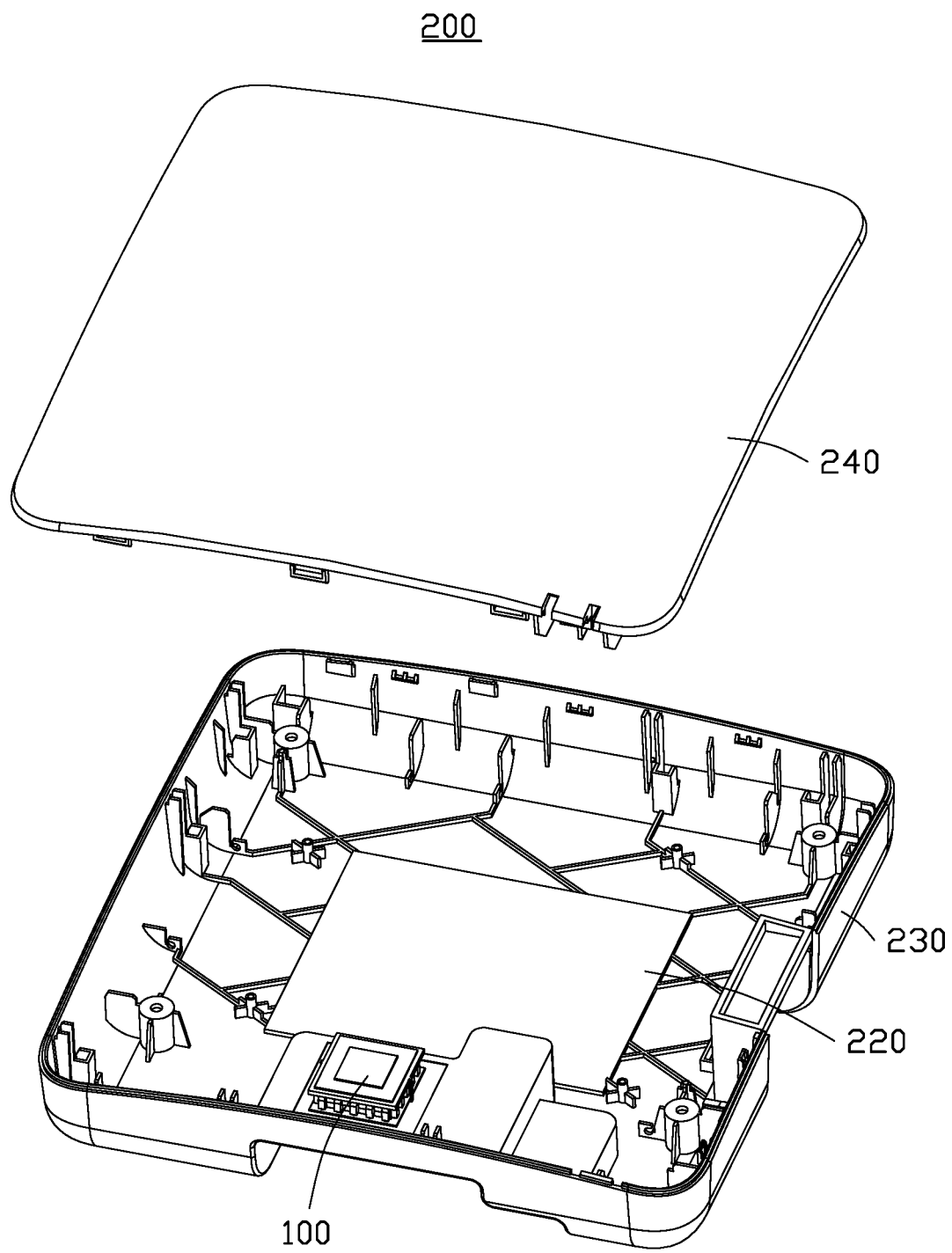
FIG. 2 is an exploded, isometric view of the electronic device shown in FIG. 1.

FIG. 1 illustrates an electronic device 200 in an enclosure with an anti-tamper mechanism. The housing 210 can include a first housing 230 and a connected second housing 240. Referring to FIG. 2, the electronic device 200 can include a housing 210 and a circuit board 220 mounted in the housing 210. The circuit board 220 can be located between the first housing 230 and the second housing 240, and positioned on an inner surface of the first housing 230. The circuit board 220 can control the electronic device 200. In at least one embodiment, the electronic device 200 can further include other functional components.

Figure 3:
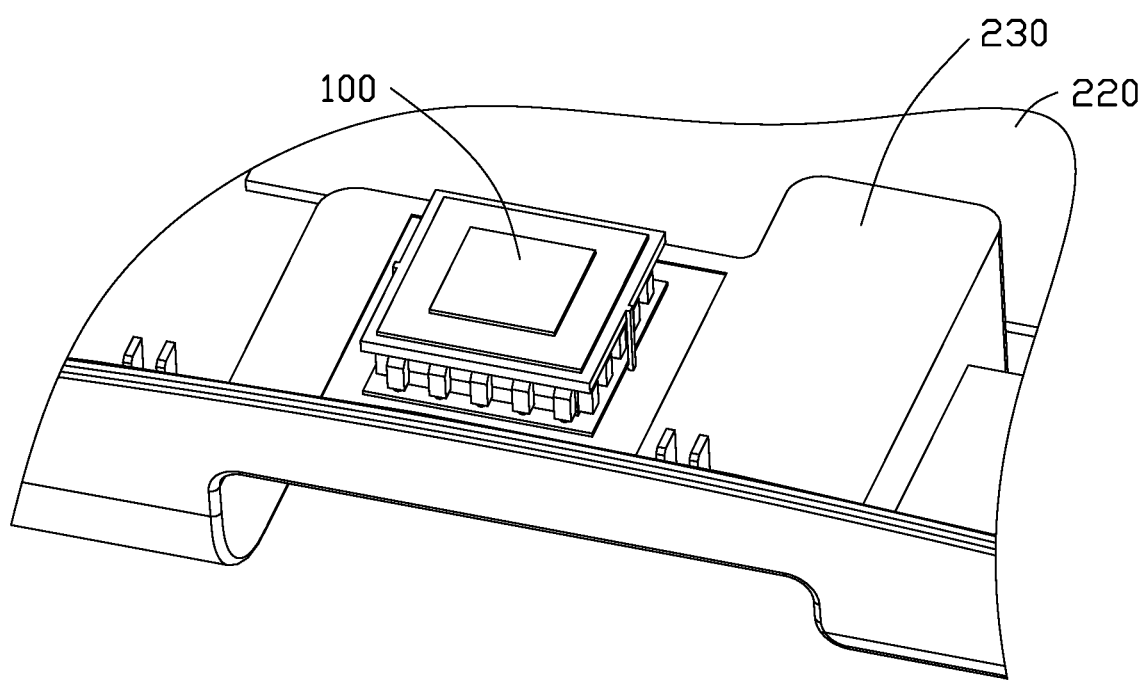
FIG. 3 is an enlarged, isometric view of part of a first housing having an anti-tamper mechanism.

Referring to FIG. 3, an anti-tamper mechanism 100 is positioned on an inner surface of the first housing 230. The anti-tamper mechanism 100 is electrically connected to the circuit board 220 of the electronic device 200. The circuit board 220 can detect and read the anti-tamper mechanism 100 to allow starting, locking, or self-destructing the electronic device 200.

Figure 4:
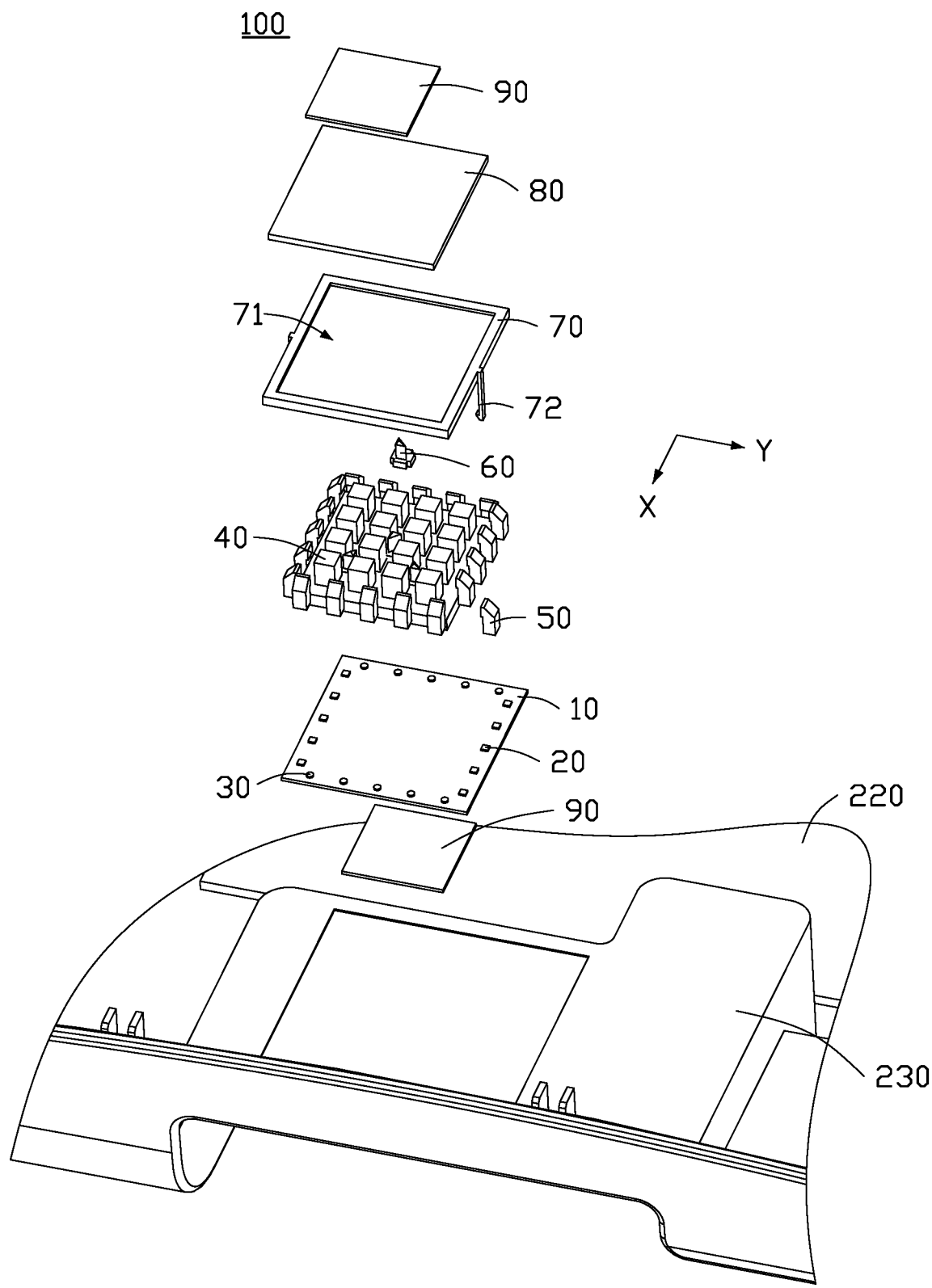
FIG. 4 is an exploded, isometric view of the first housing having the anti-tamper mechanism shown in FIG. 3.

Referring to FIG. 4, the anti-tamper mechanism 100 can include a main circuit board 10, a plurality of light sources 20, a plurality of sensors 30, a base 40, a plurality of light guiding members 50, a plurality of optical members 60, a cover 70, and a magnetic member 80. The main circuit board 10 is substantially rectangular. The main circuit board 10 can be positioned on the first housing 230 and can be adjacent to an edge (not labeled in FIG. 4) of the first housing 230. The main circuit board 10 can be electrically connected to the circuit board 220. The main circuit board 10 can set an initial password according to pulse electrical signals converted by light signals received by a sensor 30. The light sources 20 can be spaced apart from each other on a side of the main circuit board 10 positioned away from the first housing 230. The sensors 30 can be spaced apart from each other on a side of the main circuit board 10 positioned away from the first housing 230. The base 40 can be positioned on the main circuit board 10 between the light sources 20 and the sensors 30.

In this embodiment, the main circuit board 10 has a central processing unit, a digital signal processor, a single chip microcomputer, or so on. The main circuit board 10 processes data, signals, and instructions.

In this embodiment, the light sources 20 can be distributed in two rows along the first direction (X-axis), the two rows of light sources 20 are respectively adjacent to opposite edges (not labeled in FIG. 4) of the main circuit board 10. There can be five rows of light sources 20, and each light source 20 can be a light emitting diode (LED).

In this embodiment, the sensors 30 can be distributed in two rows along the first direction (Y-axis), the two rows of sensors 30 are respectively adjacent to other opposite edges (not labeled in FIG. 4) of the main circuit board 10. There can be five rows sensors 30, and each sensor 30 can be a photo-resistor.

Figure 5:
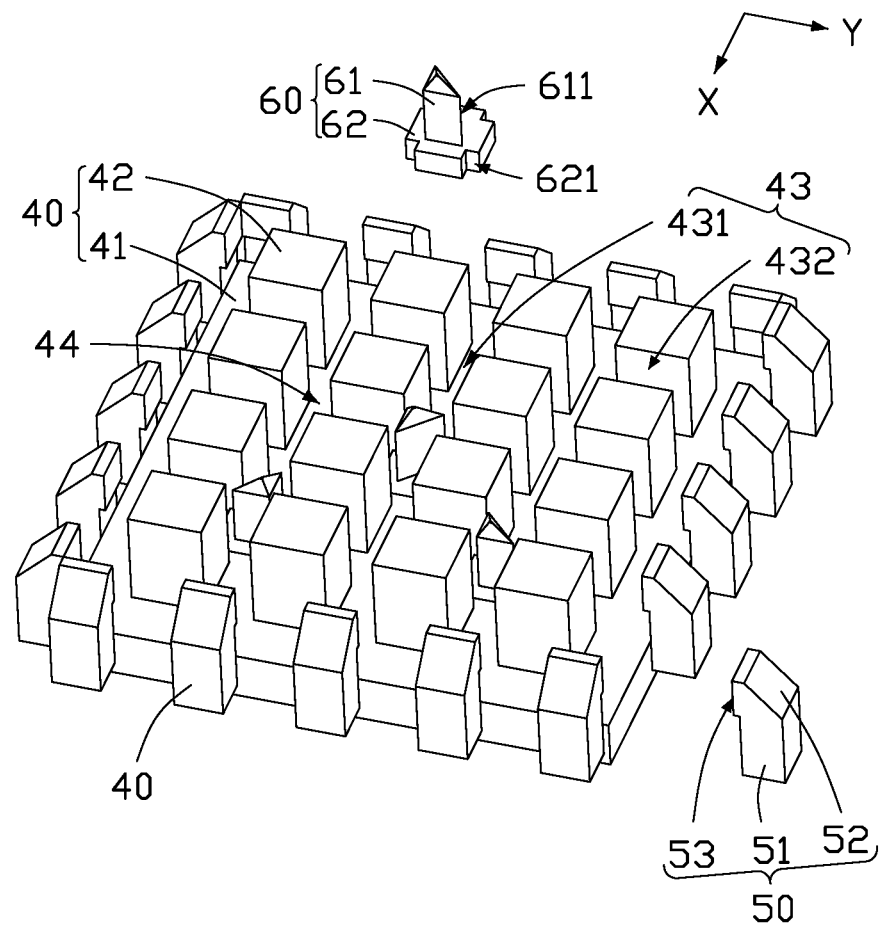
FIG. 5 is an isometric view of a base, a light guiding member, and an optical member of the anti-tamper mechanism.

Referring to FIG. 5, the base 40 can include a base body 41 and a plurality of guiding members 42. The base body 41 can be a substantially rectangular plate. The base body 41 can be positioned on the main circuit board 10. Each guiding member 42 can be substantially prismatic. The guiding members 42 can be positioned on one side of the base body 41 in an array away from the main circuit board 10. A plurality of interlaced light guiding passages 43 is defined between the guiding members 42. A receiving space 44 is defined between each of four of the guiding members 42. In this embodiment, a first light guiding passage 431 is defined between adjacent rows of guiding members 42 arranged in the first direction (X-axis), and a second light guiding passage 432 is defined between adjacent rows of guiding members 42 arranged in the second direction (Y-axis). The receiving space 44 can be located at a central point between the four guiding members 42 and at the intersection of the first light guiding passage 431 and the second light guiding passage 432. There can be sixteen guiding members 42, in other embodiments, the number of guiding members 42 can be as desired.

The light guiding members 50 can be spaced apart from each other on a periphery of the base body 41 and can be uniformly arranged along the periphery (not shown) of the base body 41. Each light guiding member 50 can be substantially L-shaped. Each light guiding member 50 can include a first light guiding portion 51, a light reflective surface 52, and a second light guiding portion 53. The first light guiding portion 51 can face one of light sources 20 or one of sensors 30. The light reflective surface 52 can be configured to reflect light emitted from the light source 20 to change a propagating direction of the light. The second light guiding portion 53 can face the first light guiding passage 431 or the second light guiding passage 432. In this embodiment, there are twenty light guiding members 50. The number of light guiding members 50 on each edge of the base body 41 can be five.

Each optical member 60 can be received in one of the receiving spaces 44 of the base 40. Each optical member 60 includes a main body 61 and a magnetic portion 62 positioned on an end of the main body 61. An end surface of the main body 61 positioned away from the magnetic portion 62 can be non-planar. In this embodiment, the main body 61 can be substantially columnar. A reflective surface 611 can be defined on the main body 61. The reflective surface 611 changes a propagating direction of a light emitted from a light source 20, the light being propagated to the sensor 30. The magnetic portion 62 can be substantially a rectangular block. At least one guide groove 621 can be defined on the magnetic portion 62. Each guide groove 621 can penetrate opposite sides of the magnetic portion 62 and be located at a corner of the magnetic portion 62. The magnetic portion 62 can be received in the receiving space 44 of the base 40. Each guide groove 621 can slidably engage to an edge (not labeled) of the guiding member 42 to guide a movement of the optical member 60. The end surface of the main body 61 away from the magnetic portion 62 can be substantially the shape of a pyramid. In at least one embodiment, the end surface of the main body 61 away from the magnetic portion 62 can be spherical or curved.

Figure 6:
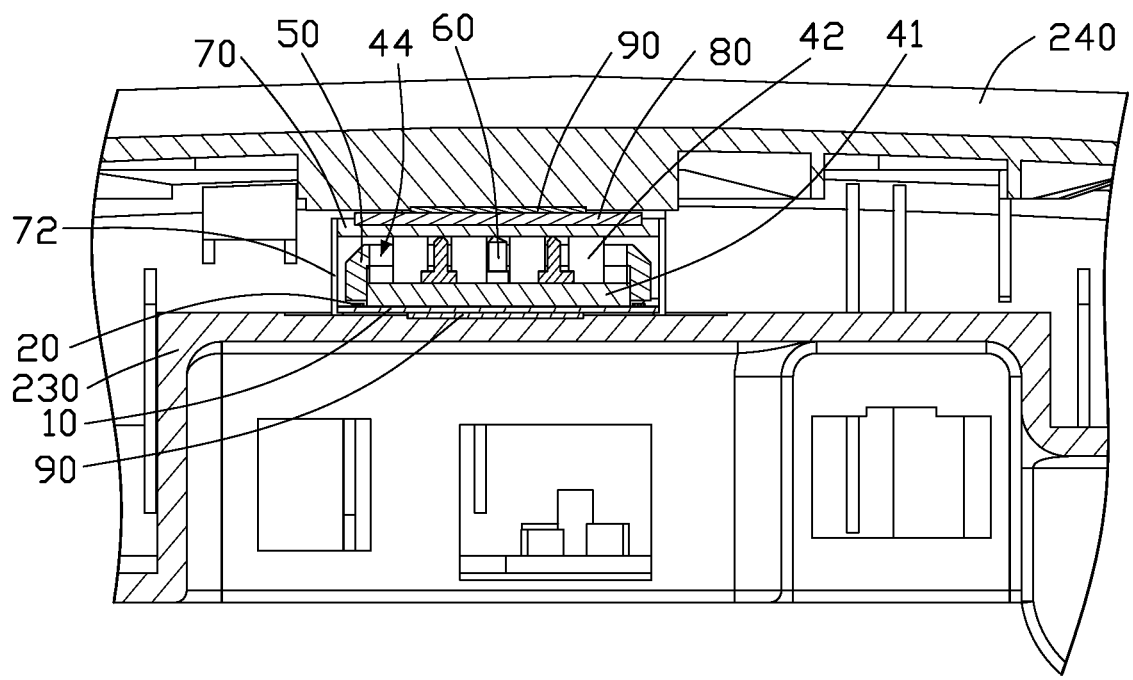
FIG. 6 is a cross-sectional view along line VI-VI of FIG. 1.

Referring to FIG. 6, the cover 70 can be positioned on the guiding members 42 of the base 40 and is in contact with a non-planar end surface of each optical member 60. The cover 70 can be a substantially rectangular plate. A receiving groove 71 (as shown in the FIG. 4) can be defined in a side of the cover 70 away from the base 40. In this embodiment, at least two hooks 72 are positioned on the cover 70. Each hook 72 is positioned on an edge (not shown) of the cover 70. Each hook 72 can engage to an edge of the main circuit board 10.

The magnetic member 80 can be positioned on the second housing 240 and can be partially received in the receiving groove 71 (as shown in the FIG. 4) of the cover 70. The magnetic member 80 can be a substantially rectangular plate. The magnetic member 80 can attract the magnetic portion 62 of each optical member 60. Thus the magnetic portion 62 can move along the receiving space 44 and be separated from the receiving space 44. The one end face of the body 61 of each optical member 60 being non-planar causes each of the optical members 60 to be loosely held on one side of the cover 70 by the attraction of the magnetic member 80 and the magnetic portion 62.

In this embodiment, the anti-tamper mechanism 100 further includes two adhesive members 90. One adhesive member 90 is located between the main circuit board 10 and the first housing 230 to fasten the main circuit board 10 to the first housing 230. The other adhesive member 90 is located between the magnetic member 80 and the second housing 240 to fasten the magnetic member 80 to the second housing 240.

Referring to FIG. 1 through FIG. 6, one adhesive member 90 can be positioned on the first housing 230. The main circuit board 10 can be pasted onto the adhesive member 90. The light sources 20 can be spaced apart from each other on a side of the main circuit board 10 positioned away from the first housing 230. The sensors 30 can be spaced apart from each other on a side of the main circuit board 10 positioned away from the first housing 230. The base 40 can be positioned on the main circuit board 10 and can be located between the light sources 20 and the sensors 30. The light guiding members 50 can be spaced apart from each other on a periphery of the base body 41. Each optical member 60 can be received in one of the receiving spaces 44 of the base 40 according to the predefined order. The other adhesive member 90 can be positioned on the second housing 240. The magnetic member 80 can be positioned on the other adhesive member 90. The cover 70 can be positioned on the magnetic member 80 and a portion of the magnetic member 80 can be received in the receiving groove 71 of the cover 70. The second housing 240 covers the first housing 230. Each hook 72 engages to an edge of the main circuit board 10 to complete the assembly of the electronic device 200.

Figure 7:
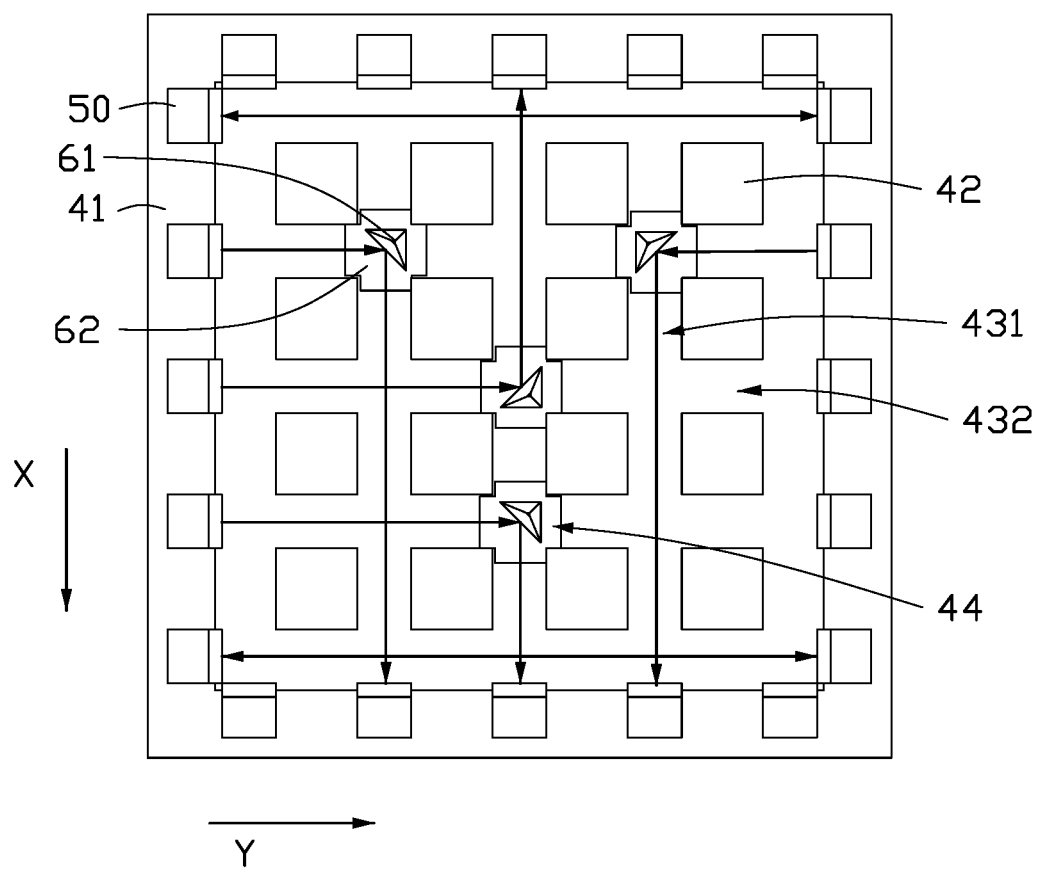
FIG. 7 is a light path diagram of a part of the anti-tamper mechanism in use.

In use, referring to FIG. 7, light emitted from a light source 20 propagates along a first light guiding passage 431 and is reflected by the reflecting surface 611 to one sensor 30. The main circuit board 10 can set an initial password according to electrical signals converted from light signals received by a sensor 30. When the electronic device 200 is detached, the magnetic member 80 attracts the magnet portion 62 of each optical member 60 to move the magnet portion 62 along the receiving space 44 to a point farther away from the receiving space 44. Since an end surface of the main body 61 is non-planar, the optical members 60 are held in a random or scattered fashion on one side of the cover 70 by the attraction of the magnetic member 80 and the magnet portion 62. Someone who does not know the predefined order cannot assemble the optical members 60 in the required predefined order to input a correct password to the main circuit board 10, an anti-tamper function is thus achieved.

In at least one embodiment, the light guiding members 50 and the cover 70 can be omitted, each light source 20 can directly face a first light guiding passage 431. Each sensor 30 can directly face a second light guiding passage 432, and the magnetic member 80 can directly cover the guiding members 42.

Figure 8:
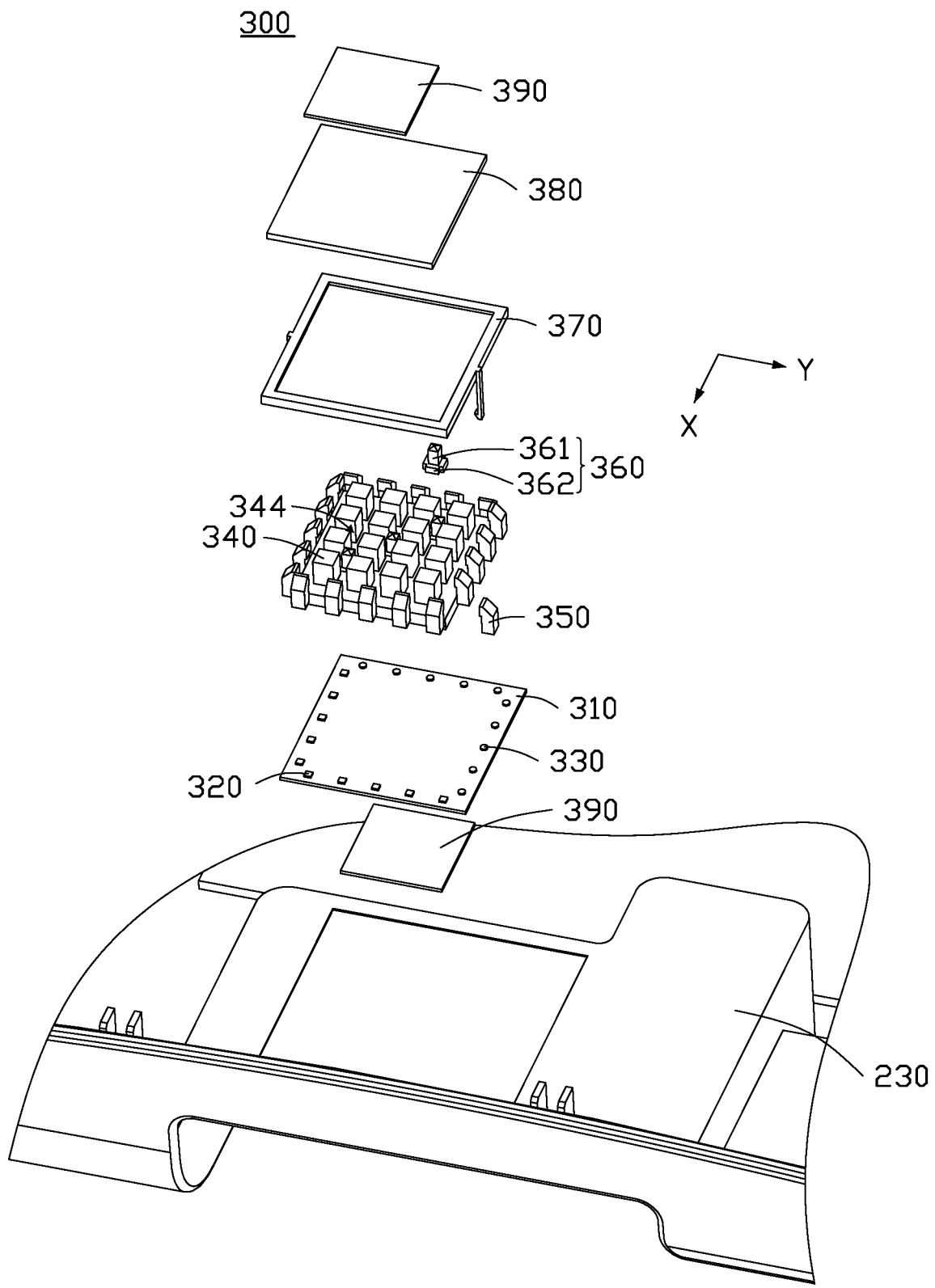
FIG. 8 is an enlarged, isometric view of part of a first housing having an anti-tamper mechanism of an electronic device in a second embodiment of the present invention.
Figure 9:
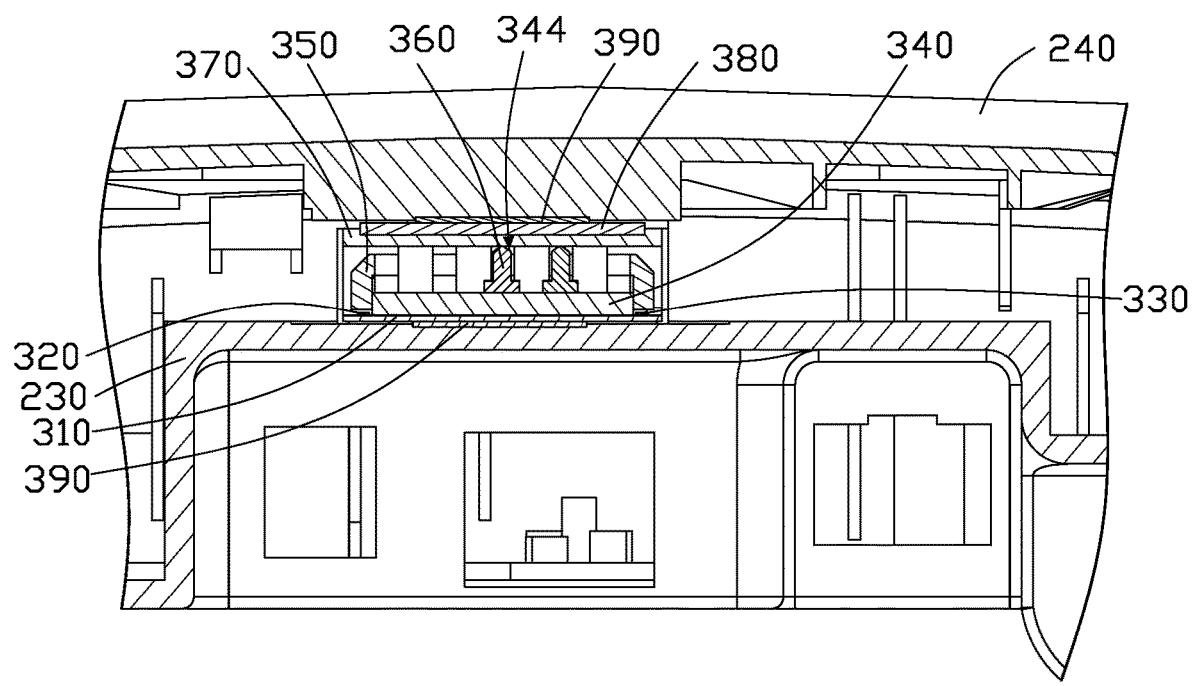
FIG. 9 is a cross-sectional view of the electronic device shown in FIG. 8 taken along a Y-axis direction and a center of two optical members.
Figure 10:
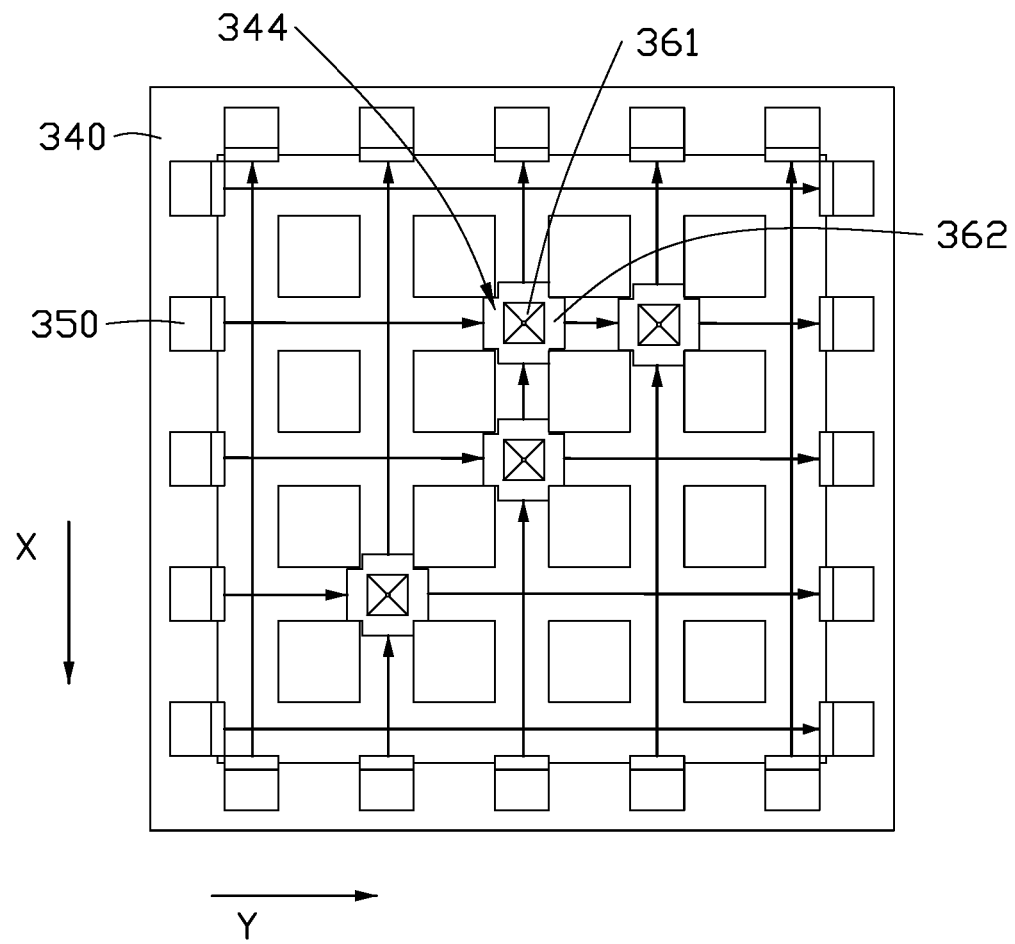
FIG. 10 is a light path diagram of part of the anti-tamper mechanism of FIG. 8 in use.

Referring to FIG. 8 through FIG. 10, the anti-tamper mechanism 300 of a second embodiment includes a main circuit board 310, a plurality of light sources 320, a plurality of sensors 330, a base 340, a plurality of light guiding members 350, a plurality of optical members 360, a cover 370, a magnetic member 380, and the two adhesive members 390. The anti-tamper mechanism 300 of the second embodiment can be similar in structure to the anti-tamper mechanism 100 of the first embodiment. The light sources 320 can be distributed in two rows, the two rows of light sources 320 being adjacent to two edges (not labeled in FIG. 8) of the main circuit board 310. The sensors 330 can be distributed in two rows, the two rows of sensors 330 being adjacent to other two edges (not labeled in FIG. 8) of the main circuit board 310. Each optical member 360 can be received in a receiving space 344 of the base 340 in the predefined order. Each optical member 360 includes a main body 361 and a magnetic portion 362 positioned on an end of the main body 361. An end surface of the main body 361 away from the magnetic portion 362 is non-planar. The main body 361 can be substantially columnar.

The main body 361 of each optical member 360 has a preset and adjacently different color and is translucent. The main body 361 of each optical member 360 can change a wavelength of light emitted from a light source 320, and the main body 361 propagates the light from the light source 320 to the sensor 330. The main circuit board 310 can set an initial password according to light signals with a changed wavelength received by a sensor 30.

In at least one embodiment, the light sources (20, 320) and the sensors (30, 330) can be positioned on the main circuit board (10, 310) in a predefined order and can be adjacent to a periphery of the main circuit board (10, 310). For the anti-taper mechanism to function, the sensor (30, 330) should be able to receive light from a light source (20, 320) by an optical member (60, 360) at all time.

In at least one embodiment, the optical members 60 of the first embodiment and the optical members 360 can be received in the receiving spaces of the base. The one sensor can receive a light emitted from a light source. The light can be reflected by the corresponding optical member 60 or a wavelength of the light can be changed by the corresponding optical member 360.

The embodiments shown and described above are only examples. Many details are often found in the art such as the other features of an anti-tamper mechanism. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An anti-tamper mechanism adapted for an electronic device comprising a circuit board, a first housing, and a second housing, the circuit board being located between the first housing and the second housing, the anti-tamper mechanism comprising:

a main circuit board on the first housing and electrically connected to the circuit board;

a plurality of light sources on at least one side of the main circuit board and adjacent to a periphery of the main circuit board;

a plurality of sensors on the side of the main circuit board and adjacent to a periphery of the main circuit board;

a base comprising:
  a base body on the main circuit board;
  a plurality of guiding members on a side of the base body in an array, a plurality of interlaced light guiding passages being defined between the guiding members, and a plurality of receiving spaces being defined among four of the guiding members;

a plurality of optical members, each of the optical members comprising:
  a main body;
  a magnetic portion positioned on the main body and movably received in one of the receiving spaces;

a magnetic member positioned on the second housing and covering the guiding members;

wherein an end surface of the main body positioned away from the magnetic portion is non-planar, each of the optical members is received in one of the receiving spaces in a predefined order, the main body of each of the optical members is adapted for changing at least one of a propagating direction and a wavelength of light emitted from one of the light sources and propagating the light to at least one of the sensors, and the main circuit board sets an initial password according to electrical signals converted from light signals received by a sensor;

wherein when the electronic device is detached, the magnetic member attracts the magnet portions of the optical members to separate the magnet portions from the receiving spaces, and the optical members are scattered randomly on one side of the magnetic member by the attraction forces of the magnetic member and the magnet portion thereby destroying the predefined order.

2. The anti-tamper mechanism of claim 1, wherein at least one guide groove is defined on the magnetic portion, each of the at least one guide groove penetrates opposite sides of the magnetic portion and is located at a corner of the magnetic portion, each of the at least one guide groove is slidably engaged to an edge of the guiding member.

3. The anti-tamper mechanism of claim 1, wherein the magnetic portion is substantially a rectangular block.

4. The anti-tamper mechanism of claim 1, wherein the anti-tamper mechanism further comprises a plurality of light guiding members, the light guiding members are spaced apart from each other on a periphery of the base body, an end of each of the light guiding members faces one of the light sources or one of the sensors, the other end of each of the light guiding members faces one of the light guiding passages.

5. The anti-tamper mechanism of claim 4, wherein each of the plurality of light guides is substantially L-shaped.

6. The anti-tamper mechanism of claim 5, wherein each of the light guiding members comprises a first light guiding portion, a light reflective surface, and a second light guiding portion, the first light guiding portion faces one of the light sources or one of the sensors, the light reflective surface is configured to reflect light transmitted by the light guiding member to change a propagating direction of the light, and the second light guiding portion faces the light guiding passage.

7. The anti-tamper mechanism of claim 1, wherein the anti-tamper mechanism further comprises a cover, the cover is positioned on the guiding members and is in contact with a non-planar end surface of each of the optical members, and the magnetic member is located between the cover and the second housing.

8. The anti-tamper mechanism of claim 7, wherein at least two hooks are positioned on the cover, each of the hooks is engaged to an edge of the main circuit board.

9. The anti-tamper mechanism of claim 1, wherein the anti-tamper mechanism further comprises two adhesive members, one of the adhesive members is located between the main circuit board and the first housing to fasten the main circuit board to the first housing, another one of the adhesive members is located between the magnetic member and the second housing to fasten the magnetic member to the second housing.

10. The anti-tamper mechanism of claim 1, wherein a reflective surface is defined on the main body, and the reflective surface is configured to change a propagating direction of light emitted from the light sources.

11. The anti-tamper mechanism of claim 1, wherein the main body of each of the optical members has a preset and adjacently different color, and the main body of each of the optical members is translucent, the main body of each of the optical members is configured to change a wavelength of light emitted from the light sources, and the main body of each of the optical members propagates light emitted from one of the light sources to one of the sensors.

12. An electronic device, comprising:
a first housing;
a second housing connected to the first housing;
a circuit board located between the first housing and the second housing; and
an anti-tamper mechanism located between the first housing and the second housing, the anti-tamper mechanism comprising:
a main circuit board on the first housing and electrically connected to the circuit board;
a plurality of light sources on at least one side of the main circuit board and adjacent to a periphery of the main circuit board;
a plurality of sensors on the side of the main circuit board and adjacent to a periphery of the main circuit board;
a base comprising:
a base body on the main circuit board;
a plurality of guiding members on a side of the base body in an array, a plurality of interlaced light guiding passages being defined between the guiding members, and a plurality of receiving spaces being defined among four of guiding members;
a plurality of optical members, each of the optical members comprising:
a main body;
a magnetic portion positioned on an end of the main body and movably received in one of the receiving spaces;
a magnetic member positioned on the second housing and covering the guiding members;
wherein an end surface of the main body positioned away from the magnetic portion is non-planar, each of the optical members is received in one of the receiving spaces in a predefined order, the main body of each of the optical members is adapted for changing at least one of a propagating direction and a wavelength of light emitted from one of the light sources and propagating the light to at least one of the sensors, and the main circuit board sets an initial password according to electrical signals converted from light signals received by a sensor;
wherein when the electronic device is detached, the magnetic member attracts the magnet portions of the optical members to separate the magnet portions from the receiving spaces, and the optical members are scattered randomly on one side of the magnetic member by the attraction forces of the magnetic member and the magnet portion thereby destroying the predefined order.

13. The electronic device of claim 12, wherein at least one guide groove is defined on the magnetic portion, each of the at least one guide groove penetrates opposite sides of the magnetic portion and is located at a corner of the magnetic portion, each of the at least one guide groove is slidably engaged to an edge of the guiding member.

14. The electronic device of claim 12, wherein the anti-tamper mechanism further comprises a plurality of light guiding members, the light guiding members are spaced apart from each other on a periphery of the base body, an end of each light guiding member faces one of the light sources or one of the sensors, the other end of the each of the light guiding members faces one of the light guiding passages.

15. The electronic device of claim 14, wherein each of the light guiding members comprises a first light guiding portion, a light reflective surface, and a second light guiding portion, the first light guiding portion faces one of the light sources or one of the sensors, the light reflective surface is configured to reflect light emitted from the light sources to change a propagating direction of the light, and the second light guiding portion faces the light guiding passage.

16. The electronic device of claim 12, wherein the anti-tamper mechanism further comprises a cover, the cover is positioned on the guiding members and is in contact with a non-planar end surface of each of the optical members, and the magnetic member is located between the cover and the second housing.

17. The electronic device of claim 16, wherein at least two hooks are positioned on the cover, each of the hooks is engaged to an edge of the main circuit board.

18. The electronic device of claim 12, wherein the anti-tamper mechanism further comprises two adhesive members, one of the adhesive members is located between the main circuit board and the first housing to fasten the main circuit board to the first housing, another one of the adhesive members is located between the magnetic member and the second housing to fasten the magnetic member to the second housing.

19. The electronic device of claim 12, wherein a reflective surface is defined on the main body, and the reflective surface is configured to change a propagating direction of light emitted from the light sources.

20. The electronic device of claim 12, wherein the main body of each optical member has a preset and adjacently different color, and the main body of each of the optical members is translucent, the main body of each optical member is configured to change a wavelength of light emitted from the light sources, and the main body of each optical member propagates the light emitted from the light sources to the sensor.

* * * * *